(12) United States Patent
Greszler et al.

(10) Patent No.: US 11,631,866 B2
(45) Date of Patent: Apr. 18, 2023

(54) LITHIUM-ION PRIMARY POUCH BATTERY

(71) Applicant: SAFT AMERICA, Cockeysville, MD (US)

(72) Inventors: Thomas Greszler, Cockeysville, MD (US); Saori Tokuoka, Cockeysville, MD (US)

(73) Assignee: SAFT AMERICA, Cockeysville, MD (US)

( * ) Notice: Subject to any disclaimer, the term of this patent is extended or adjusted under 35 U.S.C. 154(b) by 115 days.

(21) Appl. No.: 16/895,399

(22) Filed: Jun. 8, 2020

(65) Prior Publication Data
US 2021/0384527 A1 Dec. 9, 2021

(51) Int. Cl.
| | |
|---|---|
| *H01M 6/18* | (2006.01) |
| *H01M 50/124* | (2021.01) |
| *H01M 50/531* | (2021.01) |
| *H01M 50/40* | (2021.01) |
| *H01M 50/105* | (2021.01) |

(Continued)

(52) U.S. Cl.
CPC ............. *H01M 6/18* (2013.01); *H01M 4/525* (2013.01); *H01M 4/583* (2013.01); *H01M 4/5835* (2013.01); *H01M 4/661* (2013.01); *H01M 6/02* (2013.01); *H01M 6/162* (2013.01); *H01M 10/0468* (2013.01); *H01M 50/10* (2021.01); *H01M 50/105* (2021.01);
(Continued)

(58) Field of Classification Search
CPC ........ H01M 6/18; H01M 4/583; H01M 4/661; H01M 50/20
See application file for complete search history.

(56) References Cited

U.S. PATENT DOCUMENTS

| | | |
|---|---|---|
| 4,423,125 A | 12/1983 | Basu |
| 4,828,834 A | 5/1989 | Nagaura et al. |

(Continued)

FOREIGN PATENT DOCUMENTS

KR 10-2009-0054630 A 6/2009

OTHER PUBLICATIONS

Helmenstine, Anne Marie, Ph.D. "Gel Definition in Chemistry." ThoughtCo, Aug. 29, 2020, thoughtco.com/definition-of-gel-605868. Retrieved online on Apr. 7, 2022.*

*Primary Examiner* — Kenneth J Douyette
(74) *Attorney, Agent, or Firm* — Sughrue Mion, PLLC

(57) ABSTRACT

Provided is pouch battery including an electrode assembly, and a case in which the electrode assembly is sealed and housed; the electrode assembly including a stacked structure of a sheet cathode, a sheet separator, and a sheet anode; the sheet cathode including a positive electrode active material disposed on a current collector; the sheet anode is thin conductive sheet on which lithium metal reversibly deposits on a surface thereof during discharging; the sheet anode being made of a conductive material other than lithium and having a surface substantially free from lithium metal prior to charging the battery. The pouch battery design is flexible and lightweight and provides high power density, making it a suitable replacement for conventional lithium-ion primary batteries and thermal batteries in many applications. Power can be further increased by the application of external compression. Additives and formation conditions can be tailored for forming a solid-electrolyte interface (SEI).

14 Claims, 8 Drawing Sheets

(51) Int. Cl.
- *H01M 50/10* (2021.01)
- *H01M 4/525* (2010.01)
- *H01M 4/583* (2010.01)
- *H01M 4/66* (2006.01)
- *H01M 6/02* (2006.01)
- *H01M 6/16* (2006.01)
- *H01M 10/04* (2006.01)

(52) U.S. Cl.
CPC ......... *H01M 50/124* (2021.01); *H01M 50/40* (2021.01); *H01M 50/531* (2021.01)

(56) References Cited

U.S. PATENT DOCUMENTS

| | | | |
|---|---|---|---|
| 5,028,500 A | 7/1991 | Fong et al. | |
| 5,576,119 A | 11/1996 | Yamin et al. | |
| 6,905,762 B1 * | 6/2005 | Jow | H01M 10/0567 429/324 |
| 7,629,077 B2 | 12/2009 | Bowles et al. | |
| 2006/0068291 A1 | 3/2006 | Herzel et al. | |
| 2009/0136833 A1 | 5/2009 | Lee et al. | |
| 2009/0305143 A1 * | 12/2009 | Matsuno | H01M 4/13 429/207 |
| 2010/0209782 A1 * | 8/2010 | Choi | H01M 10/0569 29/623.5 |
| 2010/0253277 A1 | 10/2010 | Chanson et al. | |
| 2012/0058378 A1 * | 3/2012 | Lee | H01M 10/0585 429/127 |
| 2013/0017437 A1 | 1/2013 | Ahn | |
| 2013/0040192 A1 | 2/2013 | Kim | |
| 2015/0115736 A1 | 4/2015 | Snyder | |
| 2018/0151856 A1 * | 5/2018 | Fischer | H01M 10/0481 |
| 2018/0294510 A1 | 10/2018 | Kitaura et al. | |
| 2018/0309092 A1 | 10/2018 | Fujishima | |
| 2019/0123315 A1 | 4/2019 | Narbonne | |
| 2019/0165584 A1 | 5/2019 | Laflaquiere et al. | |
| 2019/0237719 A1 * | 8/2019 | Subramanian | H01M 10/0481 |
| 2019/0393556 A1 * | 12/2019 | Matsuoka | H01M 10/0569 |

* cited by examiner

LITHIUM-ION PRIMARY POUCH BATTERY

BACKGROUND

Technical Field

The present disclosure presents a lithium-ion primary pouch battery having an essentially lithium-free design.

Description of Related Art

Various types of lithium electrochemical cells in non-aqueous solvents are known in the art. Primary solid cathode lithium cells typically include a lithium anode, an electrolyte prepared from lithium salts dissolved in one or more organic solvent and a cathode containing electrochemically active materials such as transition metal oxides, metal sulfides, fluorinated carbon compounds, etc.

A drawback of such lithium cells arises from the highly reactive nature of lithium metal in air. Lithium readily reacts with water vapor in air. Therefore, lithium anodes must be prepared in an entirely dry atmosphere. The preparation of metallic lithium anodes can be cumbersome, expensive and may also be hazardous.

Another drawback of primary lithium cells is encountered in high-power primary lithium cell designs where a thin metallic lithium anode is required. A common problem in such high power cells is the low tensile strength of metallic lithium. The preparation of metallic lithium anodes may therefore require the use of excess lithium in the anode to increase the thickness of the lithium in the anode (to provide better mechanical strength), or the incorporation into the anode of an electrically conducting support such as a metallic or a metalized supporting foil or supporting mesh (for example, a copper or nickel foil or mesh or another metal plated with gold or chromium or the like, may be used to increase the anodes mechanical strength) or another suitable electrically conducting support or the like. The use of such a conducting support (onto which the lithium is plated or deposited or attached), can suitably increase the mechanical strength of the anode.

The first approach (excess lithium) markedly reduces the practical energy density (available energy per volume unit) achievable by the cell. The second approach (using a thin conducting support) may markedly complicate the anode manufacturing process because a vacuum deposition method or other similar manufacturing methods may have to be used to deposit the thin layer of metallic lithium on the conducting support. Such techniques are inefficient for mass production processes, may require costly equipment, and may have to be performed in batch.

One approach for conventional primary lithium cells is to use cathode materials such as transition metal oxides (or transition metal chalcogenides) in combination with carbonaceous anodes based, for example, on graphite or petroleum coke capable of intercalating lithium ions. In this approach, lithium ions have to be removed from the lithiated cathode by an externally applied charging current and intercalated into the carbonaceous anode.

This approach, while increasing the operating voltage of the call, has two main drawbacks. A first drawback is a very high self-discharge rate of the resulting cells (typically about 5% of the cell's charge per month). While such a high self-discharge rate value may be commercially acceptable for rechargeable lithium cells, it is not acceptable for most of primary lithium cells for which a loss of up to 0.1% of the cell's charge per month is typically required. A second drawback is they typically have a low energy density as compared to primary lithium cells. The main reason for this low energy density arises from the low theoretical capacity value of the carbonaceous anode in comparison to a lithium metal anode.

As for rechargeable electrochemical lithium cells, various types of non-aqueous rechargeable lithium cells are well known in the art. Rechargeable lithium cells, such as the cells described in U.S. Pat. No. 4,828,834 (the US '834 patent), incorporated herein by reference in its entirety for all purposes, include a highly electroactive metallic lithium based anode, a lithium salt, organic solvents and an electrochemically active cathode. In such cells, during discharge, lithium ions pass from the anode through the liquid electrolyte and are intercalated into the cathode. During the charging of the cell, the flow of ions is reversed. Lithium ions pass from the cathode through the electrolyte and are deposited back as metallic lithium atoms on the lithium anode. Typically, a quality of the lithium layer deposited or plated on the anode during the charging of the cell may not be good enough for many charge discharge cycles. This kind of lithium deposition tends to yield a high surface area plating form known as dendrites. Such dendrites typically continue to grow upon cycling of the cell. Unfortunately, lithium dendrite formation limits the number of permissible charging/discharge cycles, as eventually the dendrites may contact the cathode which may result in cell failure. Dendritic lithium formation in rechargeable cells may thus make such cells inherently less stable since, if such a cell short-circuit occurs, the cell may explode. Also, the high-surface area dendritic lithium on the anode surface tends to react with the electrolyte to form an electrically isolated non-active substance. As a result, the amount of the remaining lithium available in the cell decreases, reducing the practically achievable energy density of the cell.

It may be possible to partially overcome this low efficiency resulting from the low quality of the lithium plating during the charging half-cycle by including a large excess of lithium metal in the cell. However, using excess of lithium in the cell increases the thickness of the anode and therefore undesirably decreases the practically achievable energy density of the cell. Moreover, using a larger quantity of lithium is inherently more dangerous, decreasing overall cell safety, and, as lithium is a comparatively expensive metal, increasing the cell's cost.

A different approach used to improve the number of charge/discharge cycles is to use a rechargeable cell having a carbonaceous anode as described in U.S. Pat. No. 4,423,125 (the '125 patent), incorporated herein by reference in its entirety for all purposes, and in U.S. Pat. No. 5,028,500 (the '500 patent), incorporated herein by reference in its entirety for all purposes. These cells include a carbonaceous anode including a suitable carbon form such as coke or graphite intercalated with lithium ions. However, side reactions with the electrolyte may lead to lithium loss in the anode and may ultimately cause cell failure. In other words, the deposition of highly reactive lithium metal on the carbonaceous anode of such prior art lithium cells is problematic.

Another approach to increase the energy density of rechargeable lithium cells beyond the energy obtained with intercalated carbon is described in U.S. Pat. No. 5,576,119 (the '119 patent), incorporated herein by reference in its entirety for all purposes. The '119 patent discloses a rechargeable electrochemical cell having an anode including a thin layer of electrically conductive material such as copper or nickel, a cathode including a lithiated metal oxide, and a separator disposed therebetween. Lithium deposition on the anode is accomplished in-situ during the first charge of the cell. The '119 patent discloses that the structure of the battery is in the form of a conventional cylindrical cell design.

U.S. Publication No. 2006/0068291 (the '291 application), incorporated herein by reference in its entirety for all purposes, discloses a variation on the cylindrical cell design described in the '119 patent, wherein the anode comprises a thin layer of a carbonaceous material capable of reversibly incorporating lithium ions therein and lithium metal on the surface.

The cylindrical cell design disclosed, for example, in the '119 patent provides certain benefits, such as good cycling ability and a long calendar life, and it is economical. However, the cylindrical cell design has certain drawbacks or disadvantages, such as being heavy and having low packaging density due to space cavities. Further, as explained herein below, an external pressure cannot easily be applied on a cylindrical cell.

Another type of cell design known in the art is the pouch cell. Rather than using, for example, a relatively rigid metallic cylinder, a pouch-type battery typically comprises a multi-layer film (e.g., a metal foil and at least one inner layer polymer film) that encloses and seals an electrode assembly, which includes a cathode, a separator, and an anode that are stacked and/or wound. Further, conductive tabs are typically connected to respective electrodes of the electrode assembly and extend to the outside of the pouch cell in a fully sealed way.

In contrast to cylindrical cells, a pouch cell offers a flexible and lightweight solution to battery design. Further, pouch cells can deliver high load currents, and can have a high packaging efficiency.

Many different pouch cell designs are known in the art, as no standardized pouch cells exist. For example, the following U.S. patents and publications disclose structures for a pouch cell: U.S. Pat. No. 7,629,077 (the '077 patent) (disclosing in FIGS. 1-5 stacked electrode assemblies having folds), U.S. Publication No. 2009/0136833 (the '833 application) (disclosing a polymer-based case film for a pouch battery for enclosing a stacked electrode assembly), U.S. Publication No. 2018/0309092 (the '092 application) (disclosing methods for producing a pouch battery, such as for reducing creases in the laminate case film that seals and encases the stacked electrode assembly), U.S. Publication No. 2018/0294510 (the '510 application) (disclosing a battery module comprising a plurality of electrically connected pouch batteries, and a housing for applying external compression to the pouch batteries), U.S. Publication No. 2013/0017437 (the '437 application) (disclosing a pouch battery comprising a stacked electrode assembly enclosed in a case), and U.S. Publication No. 2013/0040192 (the '192 application) (disclosing a pouch battery comprising an electrode assembly enclosed in a case), each incorporated herein by reference in their entirety for all purposes (in particular for their disclosure of the pouch cell structures noted above).

Another type of battery design is a thermal battery. A conventional thermal battery may comprise a stack of series cells, each cell comprising a cathode, an electrolyte, an anode and a pyrotechnic thermal energy source. Thermal batteries are non-rechargeable, single use batteries that can typically be stored for a long time.

Thermal batteries have many uses including, for example: space exploration vehicles, satellites, consumer products, and electric and hybrid vehicles.

Advantages of thermal batteries include, for example, long storage life, little to no maintenance required, high power density, wide operating temperature, robustness, and reliability. Disadvantages of thermal batteries can include, for example, short activated life, relatively high external surface temperature during use because of the pyrotechnic thermal energy source, non-linear output voltage, inability to test functionality (e.g., an open-circuit voltage (OCV) test), and one-time use.

There still exists the need for a battery capable of providing a high energy density compared to conventional lithium-ion cells, in a flexible design (size/shape/performance), that is light weight, that is operational over a wide temperature range, and that can be periodically monitored for functionality.

SUMMARY OF THE DISCLOSURE

The embodiments of the present disclosure provide a pouch-type battery cell design for addressing the needs described above. In particular, embodiments of the present disclosure provide a pouch-type battery cell having an essentially lithium-free design. The term "lithium free" means that the battery does not contain lithium metal when the battery is installed, but that lithium is deposited in metallic form and then consumed in a controlled and reversible manner in situ during battery operation. Typically, lithium is deposited in the negative electrode during charging and then consumed during discharge.

According to a first exemplary embodiment of the present disclosure, a pouch battery is disclosed, including: an electrode assembly; and a multi-laminate case in which the electrode assembly is sealed and housed. In a first aspect of this embodiment, the electrode assembly is formed by respectively overlaying a sheet cathode, a sheet separator, and a sheet anode to form a stacked structure, the stacked structure being optionally folded and/or wound upon itself; the electrode assembly includes a cathode tab electrically connected to the sheet cathode, and an anode tab electrically connected to the sheet anode, the electrode tab and the anode tab extending from inside of the case to outside of the case; the sheet cathode includes a positive electrode active material disposed on a current collector; the sheet anode consists essentially of a conductive metal other than lithium; lithium metal is reversibly deposited on a surface of the sheet anode during charging of the battery; and the electrode assembly includes an electrolyte in contact with the sheet cathode and the sheet anode.

In a second embodiment of the disclosure, the sheet cathode includes an ultra-thin carbonaceous layer on a surface of the conductive metal, the ultra-thin carbonaceous layer having a thickness in a range from greater than 0 to 50 μm.

In a third embodiment of the disclosure, the ultra-thin carbonaceous layer is a carbon allotrope or a derivative thereof, such as graphite, amorphous carbon, graphene, etc.

In a fourth embodiment of the disclosure, the electrolyte comprises a non-aqueous solvent and a lithium salt.

In a fifth embodiment of the disclosure, the separator and the electrolyte are a single structure comprising a solid electrolyte. That is, a solid electrolyte layer functions as the separator and the electrolyte.

In a sixth embodiment of the disclosure, the conductive metal is selected from the group consisting of copper, nickel, and stainless steel. In an alternative to the first embodiment, the sheet anode consists essentially of a conductive polymer.

In a seventh embodiment of the disclosure, an ultra-thin carbonaceous layer is coated on a surface of the conductive metal of the sixth embodiment, the ultra-thin carbonaceous layer having a thickness in a range from greater than 0 to 50 µm.

In an eighth embodiment of the disclosure, the pouch battery includes means for applying external compression to surfaces of the case in a stacking direction of the stacked structure during operation of the pouch battery.

In a ninth embodiment of the disclosure, the electrolyte includes a non-aqueous solvent, a lithium salt, and an additive for forming a solid-electrolyte interface (SEI), and a content of the additive is 0.5 to 10% by weight when a total weight of the electrolyte is considered to be 100%.

In a tenth embodiment of the disclosure, the positive electrode active material is a compound according to one of the following formulas (A) to (E) or a blend thereof:

$$Li_{1+x}M1_aX_bPO_4 \qquad \text{formula (A);}$$

$$Li_{1+x}Ni_aM2_dO_2 \qquad \text{formula (B);}$$

$$LiMn_2O_4 \qquad \text{formula (C);}$$

$$Li_{1+x}CoO_2 \qquad \text{formula (D);}$$

$$LiVPO_4F \qquad \text{formula (E);}$$

wherein, in formula (A), M1 is at least one selected from the group consisting of Fe, Mn and Co; X is at least one transition metal selected from the group consisting of Ni, V, Y, Mg, Ca, Ba, Al, Sc and Nd; $0 \le x \le 0.15$; $a>0$; $b \ge 0$; and $a+b=1$, wherein, in formula (B), M2 is at least one selected from the group consisting of Co, Al and Mn; X is at least one transition metal selected from the group consisting of Ni, V, Y, Mg, Ca, Ba, Al, Sc and Nd; $0 \le x \le 0.15$; $a>0$; $d>0$; and $a+d=1$, and wherein, in formula (D), $0 \le x \le 0.15$.

In an eleventh embodiment of the disclosure, a battery module is disclosed, including: a plurality of the pouch battery according to the first embodiment aligned in a stacking direction of the stacked structure of the electrode assembly and being electrically connected to each other; a housing accommodating the batteries; and means for compressing the pouch batteries in the stacking direction of the stacked structure during operation of the battery module.

In a twelfth embodiment of the disclosure, the means for compressing applies a force of 0.5 Bar or greater and 5 Bar or less to the pouch batteries during operation of the battery module.

In a thirteenth embodiment of the disclosure, a battery module is disclosed, including: a housing including a first end plate and a second end plate; a plurality of the pouch battery according to the first embodiment aligned in a stacking direction of the stacked structure of the electrode assembly, the pouch batteries being disposed between the first end plate and the second end plate; and means for moving the first end plate relative to the second end plate to control an external compression force on the plurality of the pouch batteries during operation of the battery module.

In a fourteenth embodiment of the disclosure, the means for moving comprises a tensioning member connected to the first and second end plates.

In a fifteenth embodiment of the disclosure, the external compression force applied to the plurality of the pouch batteries of the thirteenth embodiment is 0.5 Bar or greater and 5 Bar or less during operation of the battery module.

The disclosed embodiments provide a pouch battery capable of providing a high energy density compared to conventional lithium-ion cells, in a flexible design (size/shape/performance), that is light weight, that is operational over a wide temperature range, has very long shelf life and can be periodically monitored for functionality.

A person of ordinary skill in the art would understand that all of the above embodiments and aspects thereof can be combined in any manner; that the embodiments and aspects thereof do not need to address any of the problems or disadvantages summarized above in the background; and that the embodiments described above are merely exemplary and not exhaustive of the embodiments disclosed herein in the detailed description.

BRIEF DESCRIPTION OF THE FIGURES

Any figures contained herein are provided only by way of example and not by way of limitation.

DETAILED DESCRIPTION OF EMBODIMENTS OF THE DISCLOSURE

It is to be understood that both the foregoing general description and the following detailed description are exemplary and are intended to provide further explanation of the claims. Accordingly, various changes, modifications, and equivalents of the methods, apparatuses, and/or systems described herein will be apparent to those of ordinary skill in the art. Moreover, descriptions of well-known functions and constructions may be omitted for increased clarity and conciseness.

The terms used in the description are intended to describe embodiments only and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Any range will be understood to encompass and be a disclosure of each discrete point and subrange within the range.

(Pouch Battery)

The present disclosure is directed to a battery having a pouch cell design (i.e., a pouch battery). Pouch batteries are well-known in the art, and there are many different structural designs for forming this cell type, as explained above in the Description of Related Art.

A pouch battery comprises a case, which is typically a multi-layer film (e.g., a metal foil layer and at least one inner layer polymer film), that encloses and seals an electrode assembly, wherein the electrode assembly includes a sheet cathode, a sheet separator, and a sheet anode that are stacked and may be wound and/or folded. Further, conductive tabs are typically connected to respective electrodes of the electrode assembly and extend to the outside of the pouch cell in a fully sealed way. Thus, a pouch battery presents a light weight, flexible design that can provide a high energy density.

Figure 1:
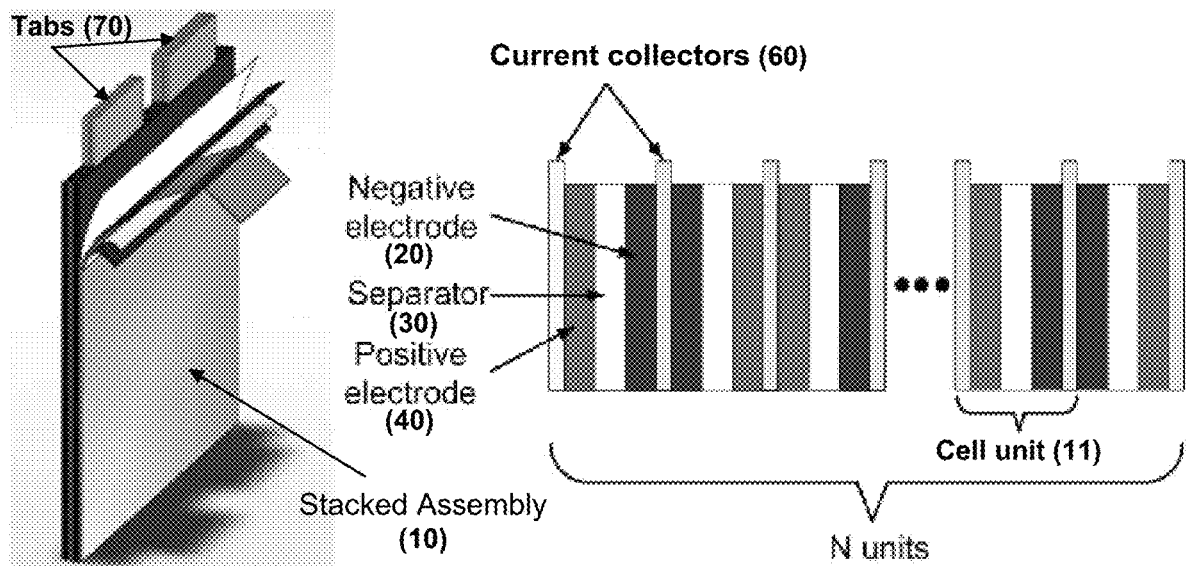
FIG. 1 is a perspective view and cross-sectional view of an electrode assembly of a pouch cell.
Figure 2:
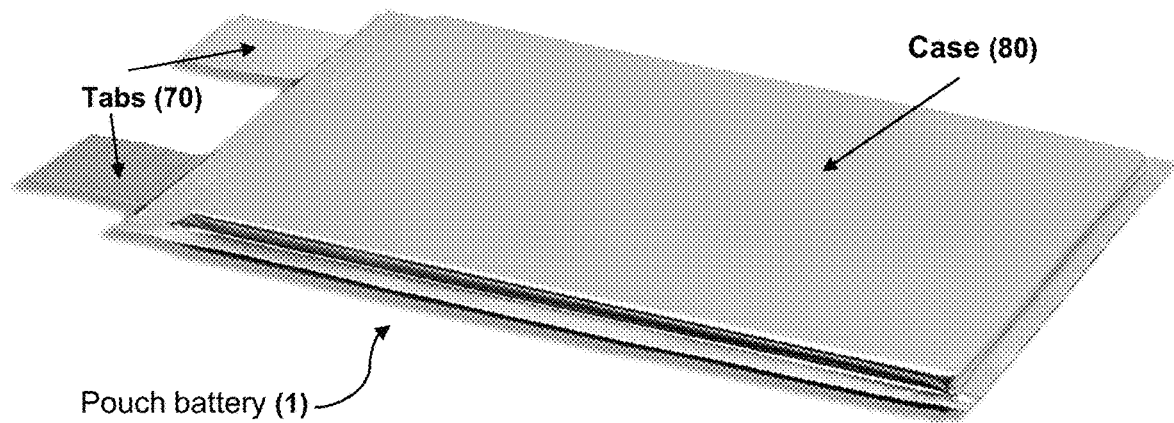
FIG. 2 is a photo (or perspective view) of a pouch battery.

FIG. 1 shows an exemplary stacked assembly 10. However, the pouch battery of the present disclosure is not limited to stacked assembly 10. The stacked assembly 10 is shown comprising a plurality of cell units 11 separated by current collectors 60, each unit having a sheet-shaped positive electrode 20, a sheet-shaped separator 30, and a sheet-shaped negative electrode 40. The electrodes are respectively connected to tabs 70. The tabs 70 are shown as being provided on one of the stacked assembly 10. However, the tabs 70 could be separately provided on opposing ends (e.g., a negative electrode tab on one end, and a positive electrode tab another end). The stacked assembly 10 shown in FIG. 1 can be sealed within a multi-laminate case 80, as shown for the pouch battery 1 in FIG. 2.

The case for use with the pouch battery of the present disclosure is not particularly limited. Multi-laminate films are well known in the art for forming the case of pouch battery. A typical multi-laminate film may contain a metal layer and at least one internal polymer layer. The '092 application mentioned above, for example, discloses exemplary multi-laminate films.

In some embodiments, the stacked assembly 10 is sealed within the case in a state in which the sheet anode, sheet separator and sheet cathode are unfolded and unwound, as shown in FIG. 1. However, it is also known in the art that the stacked assembly 10 can be folded and/or wound upon itself (this is shown, for example, in the US '077 patent).

Prior to sealing the film forming the case, a nonaqueous electrolytic solution comprising a solvent and an alkali metal (e.g., lithium) is included. However, in some embodiments, the separator can be a sheet-shaped solid electrolyte (and thus, the addition of an electrolytic solution would not be required).

As is known in the art, a large amount of gas may be generated during the first charging of the pouch battery. Thus, it is known in the art to include a gas release structure/valve for discharging excessively generated gas. Alternatively, a portion of the case film might be only temporarily sealed (and then permanently sealed after discharging generated gas). Other structures for releasing excess gas are known. Discharging excessively generated gas can be necessary in some embodiments because, in contrast to a cylindrical cell comprising a relatively rigid outer case (such as a metal cylinder), the pouch battery uses a relatively flexible case material.

(Negative Electrode)

The pouch cell of the present disclosure is considered to be an essentially lithium-free design compared to most conventional rechargeable batteries. In some embodiments, the negative electrode is a sheet-shaped anode (or sheet anode) that consists of only a thin conductive metal sheet—which is made of a conductive metal other than metallic lithium—and which reversibly has deposited on a surface thereof an alkali metal (e.g., lithium). In other words, the anode is a thin conductive metal sheet that neither alloys lithium ions nor is made from metallic lithium. During charging of the cell, a (typically uniform) layer of the alkali metal (e.g., lithium) is deposited on the sheet anode. The surface of the sheet anode is substantially free from lithium metal prior to charging the battery.

The material of the conductive metal sheet is not particularly limited, and any conductive metal, alloy, or polymer is contemplated. In some embodiments, the conductive metal sheet is made a conductive metal such as copper, nickel, or stainless steel (e.g., a copper foil, a nickel foil, etc.). Alternatively, the conductive metal can be a metal coated by another metal such as copper, nickel or stainless steel or it can be coated by chromium or gold (e.g., a copper foil coated with a thin layer of nickel). In alternative embodiments, the conductive metal can be an electronic conductive polymer.

The sheet anode of the pouch battery of the present disclosure is relatively thin compared to most conventional lithium-ion batteries. This makes the overall size and thickness of the pouch battery smaller relative to other batteries. This results in a cell yielding high capacity and energy. In some embodiments, the thickness of each sheet anode (which, as noted above, may consist of only the bare conductive metal sheet) is about 5 to 600 μm, preferably about 10 to 200 μm, and more preferable about 30 to 70 μm.

The thickness ranges for the sheet anode refer to a thickness of the entire anode structure of the pouch battery (that is, the thickness when the sheet anode consists of only the bare conductive metal sheet; the thickness when the sheet anode consists of a base metal coated with a conductive metal; the thickness when the conductive metal sheet is coated with a carbonaceous layer (discussed below); etc.).

In some embodiments, the conductive metal sheet may be coated with an ultra-thin layer of a carbonaceous material. The ultra-thin layer of carbonaceous material can provide for a uniform and homogeneous plating of Li on the surface of the conductive metal sheet.

The thickness of the ultra-thin layer of carbonaceous material is about greater than 0 to 50 μm, preferably about 2.5 to 30 μm, and more preferably about 4 to 10 μm. Further, a coating weight of the of the carbonaceous material can be about 0.1 to 5.0 mg/cm$^2$, preferably about 0.3 to 2.0 mg/cm$^2$, and more preferably about 0.5 to 1.0 mg/cm$^2$.

The carbonaceous material can be a carbon allotrope or a derivative thereof. Examples of the carbon allotrope include graphite and amorphous carbon. A carbon allotrope derivative may comprise a plurality of hydrophilic groups selected from a carboxyl group, a carbonyl group, an epoxy group, a hydroxyl group, a hydroperoxy group, a peroxy group, an isocyanate group, or a combination thereof. Exemplary carbon allotrope derivatives include graphene oxide, an oxidized 3-dimensional carbon structure, a fullerenol, or a combination thereof. Examples of the carbonaceous material also include coke, petroleum coke, carbon-black, hard carbon or any other suitable carbonaceous material or carbon form known in the art.

The ultra-thin carbonaceous layer may also contain Si or SiOx.

In a preferred embodiment, 60% by weight to 100% by weight of the ultra-thin carbonaceous layer is graphite, amorphous carbon, or a combination thereof.

The ultra-thin carbonaceous layer can be applied to base conductive material by any known method, such as coating, dipping, spraying, deposition, etc. In some embodiments, the carbonaceous material is mixed with a binder, and then this composition is coated and/or pressed on the conductive metal sheet.

When a binder is used for applying the ultra-thin carbonaceous layer to the conductive metal sheet, known materials for this function can be used. For example, the binder material may contain one or more of the following components: polyvinylidene fluoride (PVdF) and its copolymers, polytetrafluoroethylene (PTFE), polyacrylonitrile (PAN), polymethyl or polybutyl methacrylate, polyvinyl chloride (PVC), polyvinylformal, polyesters and amide block polyethers, polymers of acrylic acid, methyl acrylic acid, acrylamide, itaconic acid, sulfonic acid, elastomers and cellulose compounds.

(Positive Electrode)

The general structure of the positive electrode (or cathode) for the pouch battery is not particularly limited. In most embodiments, the sheet cathode comprises a positive electrode material containing a positive active material disposed on a current collector, and the positive electrode material may include one or more binder materials and/or one or more conductive materials. A difference between the pouch battery of the present disclosure and most conventional batteries is that, because the sheet anode is relatively thin, the thickness of the cathode can be made larger.

The positive active material for the cathode is not particularly limited, and any known positive electrode active materials can be employed. Exemplary positive active materials include the following compounds according to formulas (A) to (D):

$$Li_{1+x}M1_aX_bPO_4 \qquad \text{formula (A);}$$

$$Li_{1+x}Ni_aM2_dO_2 \qquad \text{formula (B);}$$

$$LiMn_2O_4 \qquad \text{formula (C);}$$

$$Li_{1+x}CoO_2 \qquad \text{formula (D);}$$

$$LiVPO_4F \qquad \text{formula (E);}$$

wherein, in formula (A), M1 is at least one selected from Fe, Mn or Co; X is at least one transition metal selected from Ni, V, Y, Mg, Ca, Ba, Al, Sc or Nd; $0 \leq x \leq 0.15$; $a>0$; $b \geq 0$; and $a+b=1$, and wherein, in formula (B), M2 is at least one selected from Co, Al or Mn; $0 \leq x \leq 0.15$; $a>0$; $d>0$; and $a+d=1$.

Exemplary compounds according to formula (A) include:
compounds according to Formula (A1): $Li_{1+x}FePO_4$ (LFP compounds);
a compound according to Formula (A2): $Li_{1+x}MnPO_4$ (LMP compounds);
a compound according to Formula (A3): $Li_{1+x}CoPO_4$ (LCP compounds);
a compound according to Formula (A4): $Li_{1+x}Fe_yMn_zPO_4$ (LFMP compounds); and
a compound according to Formula (A5): $Li_{1+x}Fe_yMn_zX_bPO_4$ (doped LFMP compounds).

In the Formulas (A1) to (A5) above, X is at least one transition metal selected from Ni, V, Y, Mg, Ca, Ba, Al, Sc or Nd; $0 \leq x \leq 0.15$; $y>0$; $z>0$; $b>0$; and $y+z+b=1$.

The compounds according to formula (B) include, for example:
lithiated oxides of nickel manganese and cobalt according to Formula (B1): $Li_{1+x}Ni_aMn_bCo_cO_2$ (NMC compounds);
lithiated oxides of nickel and manganese according to Formula (B2): $Li_{1+x}Ni_aMn_bO_2$ (LNMO compounds);
lithiated oxides of nickel, cobalt and aluminum according to Formula (B3): $Li_{1+x}Ni_aCo_bAl_cO_2$ (NCA compounds); and
lithiated oxides of nickel, cobalt, manganese and aluminum according to Formula (B4): $Li_{1+x}Ni_aMn_bCo_cAl_dO_2$ (NMCA compounds).

In the Formulas (B1) to (B3) above, $a>0$; $b>0$; $c>0$; and $a+b+c=1$, and in Formula (B4) above, $a>0$; $b>0$; $c>0$; $d>0$; and $a+b+c+d=1$.

Another exemplary positive active material is $LiVPO_4F$ (LVPF compounds), referred to above as formula (E).

The selection of a positive active material is not particularly limited, and the positive active material can be any one of the exemplary materials selected from NMC, NMCA, LMO, LNMO, NCA, LCO, LFP, LMP, LCP, LMFP, doped LMFP, and LVPF or blends thereof.

The current collector is not particularly limited and known materials and designs can be used. In one embodiment, the current collector is a two-dimensional conducting support such as a solid or perforated sheet, based on carbon or metal, such as nickel, steel, stainless steel or aluminum.

The use of binder material is not particularly limited and known materials for this function can be used. For example, the binder material may contain one or more of the following components: polyvinylidene fluoride (PVdF) and its copolymers, polytetrafluoroethylene (PTFE), polyacrylonitrile (PAN), polymethyl or polybutyl methacrylate, polyvinyl chloride (PVC), polyvinylformal, polyesters and amide block polyethers, polymers of acrylic acid, methylacrylic acid, acrylamide, itaconic acid, sulfonic acid, elastomers and cellulose compounds.

Among the elastomers which may be used, mention may be made of ethylene/propylene/diene terpolymers (EPDM), styrene/butadiene copolymers (SBR), acrylonitrile/butadiene copolymers (NBR), styrene/butadiene/styrene block copolymers (SBS) or styrene/acrylonitrile/styrene block copolymers (SIS), styrene/ethyl en e/butyl en e/styrene copolymers (SEBS), styrene/butadiene/vinylpyridine terpolymers (SBVR), polyurethanes (PU), neoprenes, polyisobutylenes (PM), butyl rubbers, hydrogenated acrylonitrile butadiene rubber (HNBR), and mixtures thereof.

The cellulose compound may be, for example, a carboxymethylcellulose (CMC), a hydroxypropylmethylcellulose (HPMC), a hydroxypropylcellulose (HPC), a hydroxyethylcellulose (HEC) or other cellulose derivative.

The conductive material is not particularly limited and any known conductive material can be used. For example, the conductive material can be selected from graphite, carbon black, acetylene black (AB), soot or one of their mixtures.

Methods of making cathodes are well known. For example, the cathode material can be combined with a binder material and/or a conductive material and applied to a current collector by a known method. For example, granules including the cathode material could be formed and then pressed to the current collector by a known method, or a slurry including the cathode material and a solvent could be coated on the current collector and then dried by a known method.

The amounts of a binder, conductive material and other additives are not particularly limited, and suitable ratios are well known in the art. The amount of the conductive material is preferably 1 wt % to 20 wt % (or any amount within this range, e.g., 4 wt % to 18 wt %), and the amount of the binder is preferably 1 wt % to 20 wt % (or any amount within this range, e.g., 1 wt % to 7 wt %), when a total weight of the positive electrode material is considered 100 wt %.

A thickness of the sheet cathode can be about 50 to 200 μm, preferably about 55 to 150 μm, and more preferably about 60 to 100 μm.

(Nonaqueous Electrolyte)

As used here, the term electrolyte refers to a material that allows ions, e.g., Li$^+$, to migrate therethrough but which does not allow electrons to conduct therethrough. Electrolytes are useful for electrically isolating the cathode and anodes of a secondary battery while allowing ions, e.g., Li+, to transmit through the electrolyte. Solid electrolytes, in particular, rely on ion hopping through rigid structures.

(Electrolytic Solution)

The nonaqueous electrolyte can be a known electrolytic solution, which includes an alkali metal salt (e.g., a lithium salt) dissolved in an organic solvent.

In most embodiments, the alkali metal salt is lithium. However, other cell chemistries are known in the art, such as sodium batteries (which employ Na$^+$ ions and a cathode based on a sodium containing material).

The use of a lithium salt is not particularly limited and known lithium salts for use in non-aqueous lithium-ion batteries can be used. In preferred embodiments, the salt may include one or more of lithium bis(fluorosulfonyl)imide ("LiFSI"), lithium bis(trifluoromethanesulfonyl)imide ("LiTF SI"), LiBF$_4$, lithium bis(oxalato)borate ("LiBOB"), LiClO$_4$, LiAsF$_6$, LiPF$_6$, LiCF$_3$SO$_3$, lithium 4,5-dicyano-2-(trifluoromethyl)imidazole ("LiTDI"), LiPO$_2$F$_2$, and the like.

In preferred embodiments, the lithium salt concentration in the electrolytic solution is more than 1.0M, more than 1.2M, more than 1.4M, more than 1.5M, more than 1.6M, more than 1.7M, more than 1.8M, or more than 2.0M. In preferred embodiments, the salt concentration is less than 4.0M, less than 3.6M, less than 3.2M, less than 2.8M, less than 2.4M, less than 2.0M, less than 1.6M, or less than 1.2M.

The solvent is not particularly limited and known solvents for non-aqueous lithium-ion batteries can be used. The solvent can be a single solvent or a mixture of a plurality solvents. The solvent can be selected from usual organic solvents, notably saturated cyclic carbonates, unsaturated cyclic carbonates, non-cyclic (or linear) carbonates, alkyl esters such as formates, acetates, propionates or butyrates, ethers, lactones such as gamma-butyrolactone, tetrahydrothiophene bioxide, nitrile solvents and mixtures thereof. Among such saturated cyclic carbonates, specific mention may be made, for example, of ethylene carbonate (EC), propylene carbonate (PC), butylene carbonate (BC), and mixtures thereof. Among unsaturated cyclic carbonates, specific mention may be made, for example, of vinylene carbonate (VC), its derivatives and mixtures thereof. Among non-cyclic carbonates, specific mention may be made, for example, of dimethyl carbonate (DMC), diethyl carbonate (DEC), ethyl methyl carbonate (EMC), dipropyl carbonate (DPC) and mixtures thereof. Among the alkyl esters, specific mention may be made, for example, of methyl acetate, ethyl acetate, methyl propionate, ethyl propionate, butyl propionate, methyl butyrate, ethyl butyrate, propyl butyrate and mixtures thereof. Among the ethers, mention may for example be made of dimethyl ether (DME) or diethyl ether (DEE), and mixtures thereof. Known fluorinated solvents can also be used, including, for example, fluorinated benzenes (such as hexafluorobenzene, pentafluorobenzene, 1,2,3,4-tetrafluorobenzene, etc.), fluorine substituted linear carbonates, etc.

(Electrolytic Solution Additives)

The electrolytic solution may include a known additive for use in a non-aqueous lithium-ion battery, and no restriction is placed on such additives by the present disclosure.

In one embodiment, an additive for forming a solid-electrolyte interface (SEI) is added (a well-known structure that can function, for example, by preventing reduction of the electrolyte). Any known additive for this purpose can be used, and particular mention is made for vinylene carbonate (VC), fluoroethylene carbonate (FEC), 1,3,2-dioxathiolane-2,2-dioxide (DTD), propane-1,3-sultone (PS), and 1,3-propene sultone (RPS).

When included, the additive for forming the SEI can be added to the solvent in an amount of 0.1 to 10 wt % based on the total weight of the solvent, or can be added in any amount with this range, such as, for example, about 0.1 to 10.0 wt %, preferably about 1.0 to 7.0 wt %, and more preferably 3.0 to 5.0 wt %.

As shown in the examples, including an additive for forming an SEI on surfaces of the cathode and anode can improve the efficiency of the pouch cells of the present disclosure.

In addition, the inventors found that varying the formation conditions can optimize SEI formation, as shown in the Examples below.

(Separator)

The use of a separator is not particularly limited and known separators for use in pouch batteries can be used. Separators are placed between both electrodes, and typically show high ionic conductivity (e.g., allow cations (e.g., Li$^+$) to pass therethrough), mechanical stability, and thermal stability. Separators are also known which stop the growth of a dendrite.

Conventional categories of separators include microporous membranes, nonwoven membranes, electrospun membranes, membranes with external surface modification, composite membranes, and polymer blends. In one embodiment, the separator is a microporous membrane made of a polyolefin-based material, such as, for example, a microporous membrane made of polyethylene (PE), polypropylene (PP) or the like.

(Solid Electrolyte Separator)

In some embodiments, the battery does not contain an electrolytic solution and a separator. Instead, a solid electrolyte layer can be used that meets the function of both the separator and the electrolytic solution (i.e., a solvent-free electrolyte), such as a solid ion-conducting polymer that is in contact with both the negative electrode and the positive electrode. Solid electrolytes rely on ion hopping through rigid structures. Solid electrolytes may be also referred to as fast ion conductors or super-ionic conductors. Solid electrolytes may be also used for electrically insulating the positive and negative electrodes of a cell while allowing for the conduction of ions, e.g., Li$^+$, through the electrolyte. In this case, a solid electrolyte layer may be also referred to as a solid electrolyte separator.

The use of a solid electrolyte separator is not particularly limited. Known solid electrolytes include polymer-based materials (e.g., polyethylene oxide (PEO), PEO-based materials (e.g., PEO-PPO, PEO-epichlorohydrin, methyleneoxy-PEO, PEO-PAAM, PEO-PMHS (polymethylhydrogen-siloxane), etc.)), ceramic-based materials, and cellulose based materials.

(Battery Module, Pack and System)

Figure 3:
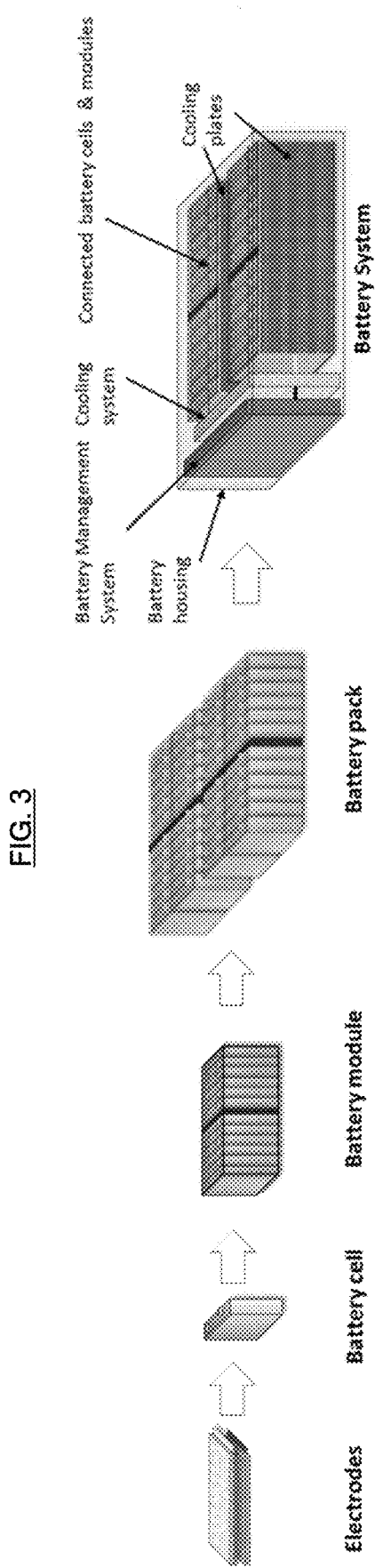
FIG. 3 is a perspective view of a different combinations of pouch cells.

Referring to FIG. 3, a battery module according to the present disclosure is a structure containing multiple pouch cells arranged side by side in a common casing; a battery pack is a structure containing a plurality of electrically connected battery modules; and a battery system is a structure containing a plurality of electrically connected pouch cells or battery modules. FIG. 3 shows control systems only in the battery system. However, FIG. 3 is simply exemplary. A battery module or pack may contain control systems.

It is well known and understood how to electrically connect the cells in series and in parallel. Several techniques are disclosed, for example, in the background and in the invention of the '510 publication, U.S. Publication No. 2019/0123315 (the '315 application) and U.S. Publication No. 2019/0165584 (the '584 application), which are incorporated herein by reference for their disclosure of techniques for assembling a plurality of electrochemical cells and modules. Further, a battery system may comprise additional structure, including a battery management system and a cooling system.

Figure 4:
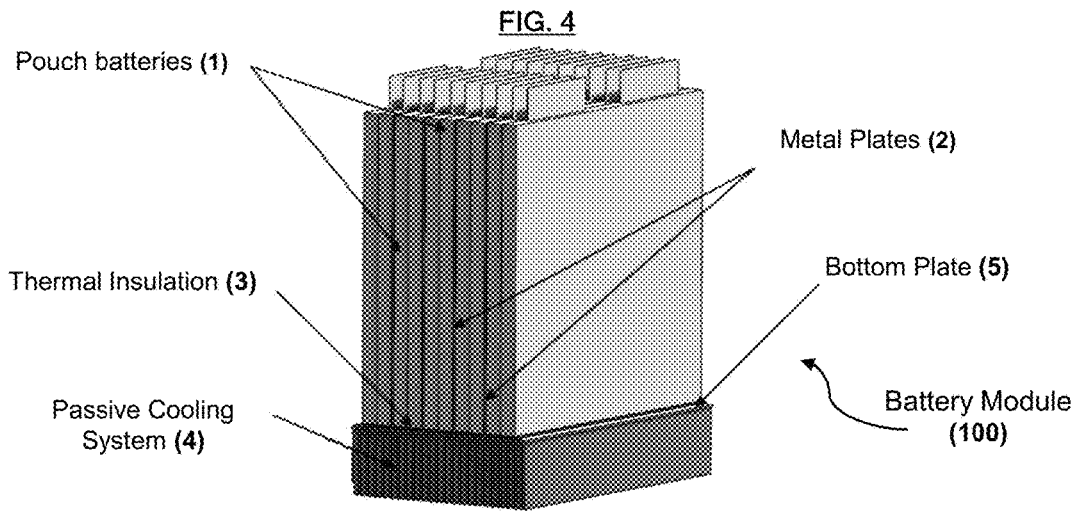
FIG. 4 is a perspective view of a battery module comprising a plurality of pouch cells.

Referring to FIG. 4, an exemplary battery module 100 is shown comprising a plurality of pouch batteries 1, which are optionally separated by metal plates 2 (for providing structural rigidity) (in some embodiments adjacent pouch batteries 1 could be separated by an insulating material). As shown, a base of the pouch cells 1 is disposed on a bottom plate 5 having a passive cooling system 4 (e.g., metal fins).

Figure 5:
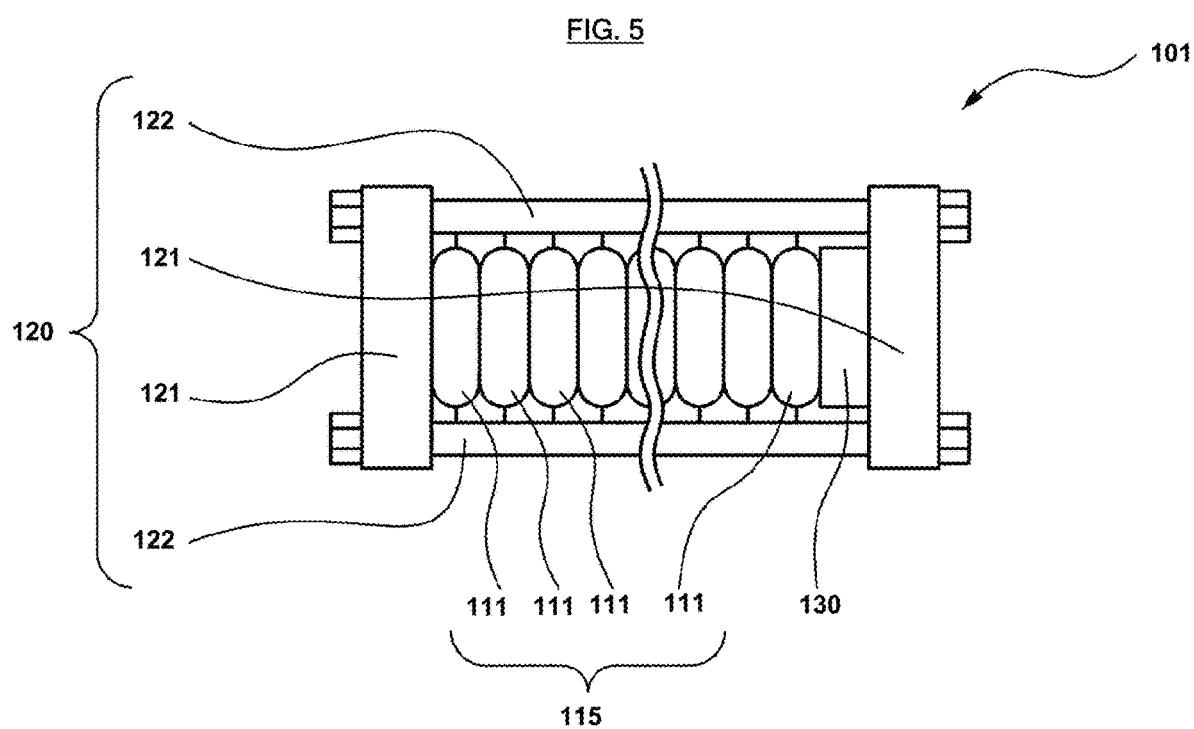
FIG. 5 is a simplified cross-sectional view of a battery module comprising a plurality of pouch cells.

FIG. 5 shows another exemplary battery module. In battery module 101, a battery laminate 115 plurality of pouch batteries 111 are electrically connected. In addition, a restraining member 120 is included, which includes a pair of end plates 121 located on both ends of the battery laminate in the direction of lamination; tensioning members 122 that fasten the pair of end plates 121 mutually; and an optional elastic member 130 located between one end of the end plates 121 and both ends of the battery laminate in the direction of lamination.

(External Pressure)

In some embodiments of the disclosure, external compression is applied to the case of the pouch battery in the stacking (or lamination) direction of the electrode assembly during operation of the batter (i.e., during charging and/or discharging). It was surprisingly discovered that increasing the external compression force on the pouch cells of the present disclosure increased the discharge capacity. In addition, it was discovered that external compression kept the impedance of the pouch cell low at low state of charge (SC). These results are shown below in the Examples.

Applying external compression during operation of the pouch battery of the present disclosure (e.g., using one or more springs or a tensioning member) follows the contraction of the cell during discharge. Even when the pouch cell shrinks during discharge, the pressure on the cells is kept constant.

In one embodiment of the disclosure, the pouch battery includes a structure for applying an external pressure on the surfaces of the case. For example, with reference to FIG. 5, battery module 101 (which contains a plurality of pouch batteries 111 arranged side by side) can be configured to apply a predetermined amount of tension between the end plates 121 located on the ends of the battery laminate 115. Bringing end plates 121 closer together compresses the plurality of pouch batteries 115, thereby increasing the external compression force acting on each of the pouch cells 111. For example, the tensioning members 122 are configured to move the end plates 121 relative to one another to control the compressive force on the pouches.

An alternative embodiment is that one or more springs are utilized to apply constant pressure in the stacking direction (e.g., springs acting directly on the end plates 121 of a module so as to compress the plurality of batteries in their stacking direction).

It is also contemplated that a tensioning member or other means for applying compression pressure to the plurality of pouches could be configured to vary the amount of compression force during operation of the battery by actuating during discharge of the pouch cells. Actuation could be driven, for example, by power derived directly from the pouch cells or by heat generated by the cells. For example, a battery management system could be configured to actuate the external compression at appropriate times.

In one embodiment, the external compression applied to the surface of the case of the pouch batteries is 0.5 Bar or greater and 5 Bar or less, preferably 0.5 Bar or greater and 3 Bar or less, and more preferably 0.5 Bar or greater and 2 Bar or less.

The ability to adjust the external pressure is a benefit of the pouch cell design, which is not attainable by the cylindrical cell design.

In particular, the inventors realized that the design of pouch cells allow easy application of external pressure. Especially for cells with lithium metal negative electrodes, it was determined that the application of external pressure maintains contact between the cell layers even as the lithium layer decreases in thickness during discharge. This continuous contact during discharge improves power as a function of state-of-charge for pouch cells versus cylindrical cells where impedance tends to increase as the state-of-charge drops.

(State of Charge)

It is well known in the art how to determine the state of charge (SoC) of lithium ion battery cells based on cell voltage, and battery management systems (BMS) configured to determine SoC based on cell voltage are also well known. Methods of cell monitoring and balancing are well known in the art. For example, such methods are discussed in U.S. Publication No. 2010/0253277 (the '277 application) and U.S. Publication No. 2015/0115736 (the '736 application), which are incorporated by reference herein for their discussion of cell monitoring and balancing, including hardware and programming for accomplishing this function.

Battery modules and/or battery systems of the present disclosure may include a known BMS, which is configured, for example, with known programing (e.g., algorithms) for determining SoC. Alternatively, the battery modules and battery systems of the present disclosure may be configured to be operated and/or monitored by an external BMS.

(Application and Use)

The pouch cell of the present disclosure provides extremely long shelf life and excellent power capabilities (improved for a pouch). These benefits, along with its low weight and design flexibility, provide a pouch battery that can replace conventional lithium-ion and other types of primary batteries in many applications. For example, these benefits can allow the pouch battery to replace the conventional thermal batteries used in many applications, such as described above in the Description of Related Art.

In addition, because the pouch cell of the present disclosure is essentially a lithium-free design (e.g., the sheet anode can be a relatively thin conductive metal other than lithium metal) as defined above, the gravimetric energy density is dramatically improved compared to conventional lithium-ion cells. Further, another benefit, the pouch cell can be probed periodically by a BMS to test functionality (e.g., OCV), which is a benefit not obtainable by conventional thermal batteries.

In addition to the typical benefits of weight/size/shape provided by the pouch cell design, the inventors determined that higher power operation can be obtained by applying external compression while the lithium is reacting and the cell thickness is reducing.

These benefits and advantages (and others) can be achieved by the pouch cell design described herein above and are demonstrated at least in part by the following Examples.

EXAMPLES

In the following, although embodiments of the present disclosure are described in further detail by means of Examples, the present disclosure is not limited thereto.

Example 1—External Compression DOE

A pouch primary cell was prepared having the following structure: (1) anode: small particle graphite coated at a thickness of 4 μm on each side of a collector; (2) cathode: an active material layer including NCA, PVDF as a binder, and carbon black as a conductive additive coated on an aluminum foil collector; (3) separator: polyethylene a thickness of 12 μm; (4) stack: 23 cathode plates and 25 anode plates stacked alternately between the separator (the separator being folded in a zig/zag pattern); (5) electrolyte: 1.2 M $LiPF_6$ in a solvent mixture of EC, DMC and EMC (30:40:30 by volume) with 3 wt. % VC as an additive; (6) compression: external compression applied to the stack using springs. The formation condition the pouch cells was C/10 CC-CV at 60° C. (i.e., C/10 is the charge rate, which means that it took 10 hours to fully charge; CC stands for constant current; and CV stands for constant voltage. Thus, CC-CV charge means charging at constant current until the max voltage is reached, at which point the charging is switched to constant voltage charge).

The pouch cell was then tested at 20 C at different external compressions and the cell pressure was maintained by springs. The results are shown in FIG. 6.

Figure 6:
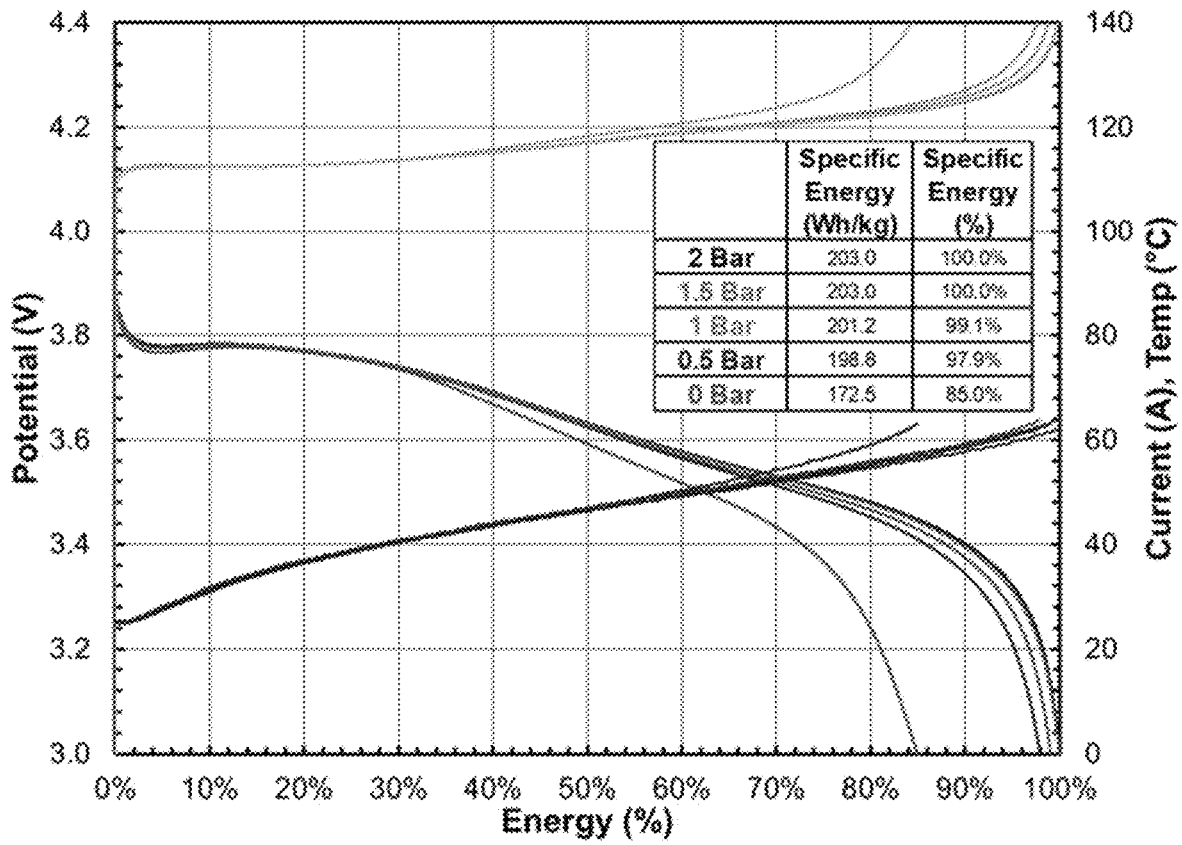
FIG. 6 shows a 20C discharge curve for a pouch cell subjected to various external compression conditions.

As shown in FIG. 6, without compression, the discharge capacity for the primary pouch cell was much lower. This demonstrates, for example, that favorable results can be obtained with a structural configuration configured to apply external pressure to the pouch cell. Further, the results show that an ideal pressure was more than 1.5 bar on the cell.

Example 2—External Compression: Impedance Vs. SOC

A pouch primary cell was prepared in the same manner as Example 1.

A cylindrical primary cell was prepared in a similar manner as Example 1, except that (1) external compression was not applied; (2) the electrode and separator were wound together (instead of stacking the electrode and separator in pouch cells).

The pouch primary cell was tested at a constant external pressure of about 2 bar using springs, and the cylindrical primary cell were tested without applying any pressure. The results are shown in FIG. 7.

Figure 7:
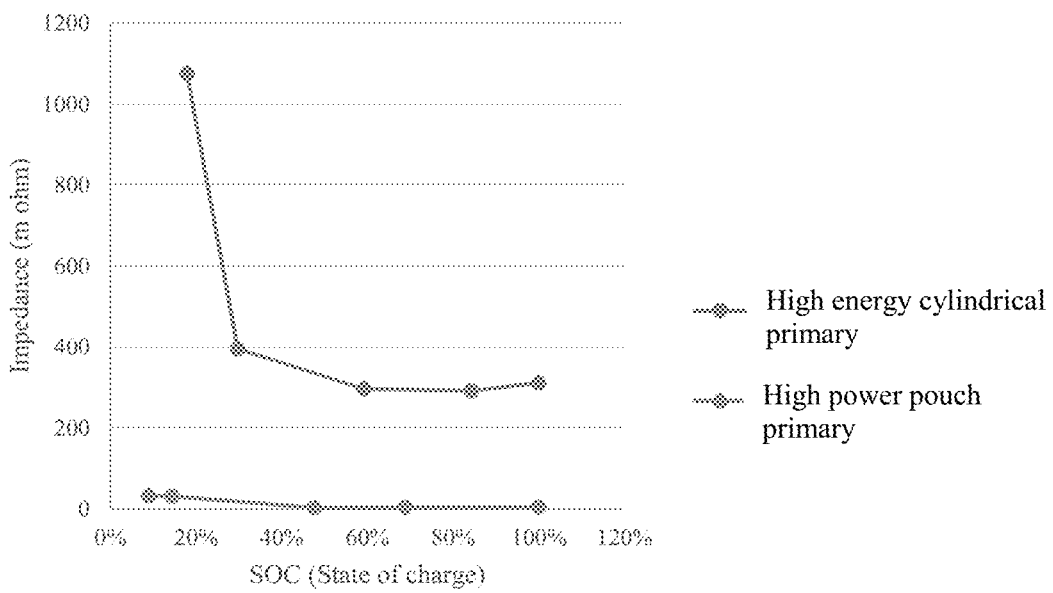
FIG. 7 shows curves for primary pouch impedance versus a cylindrical cell.

As shown in FIG. 7, the impedance of the cylindrical primary cell at low state of charge (SOC) was significantly increased due to very low pressure. In contrast, the impedance of the pouch primary cell at low SOC was kept low due to external compression.

Example 3—Electrolyte Additive

Primary pouch cells were prepared in the manner as Example 1, except for the variations listed in Table 1 below:

TABLE 1

| Chemistry | Electrolyte | C1 (Ah) | D1 (Ah) | Efficiency (%) |
|---|---|---|---|---|
| Design 1 | Electrolyte solvent 1 with 3 wt. % VC additive | 5.2 | 4.3 | 82% |
| | Electrolyte solvent 1 with no additives | 5.5 | 4.2 | 75% |
| Design 2 | Electrolyte solvent 2 with 3 wt. % VC additive | 5.4 | 4.4 | 81% |
| | Electrolyte solvent 2 with no additives | 6.4 | 3.7 | 57% |

C1 = Charge Capacity;
D1 = Discharge Capacity;
Solvent 1 = EC/DMC/EMC = 30/40/30 vol %
Solvent 2 = EC/DMC/EMC/MB (methyl butyrate) = 30/20/30/20 vol %

The test conditions for the experimentation reported in Table 1 were as follows: Charge: C/10 CC-CV to 4.25V at 25° C. (i.e., C/10 is the charge rate, which means that it took 10 hours to fully charge; CC stands for constant current; and CV stands for constant voltage. Thus, CC-CV charge means charging at constant current until the max voltage is reached, at which point the charging is switched to constant voltage charge); Discharge: C/2 CC discharge (4.25V to 2.5V) at 25° C. and a constant external pressure of 2 bar (i.e., C/2 is the discharge rate, which means that it took 2 hours to discharge to 2.5 V at constant current).

The results of the experimentation summarized in Table 1 show significant charge-deficiency increases by adding electrolyte additives, and moreover, the increase was shown to be unrelated to the type of solvent.

Example 4—Formation Conditions

For this example, the formation conditions were varied and optimized to make a stable sold-electrolyte interface (SEI), which minimized self-discharge during storage.

Pouch primary cells were prepared in the same manner as Example 1, except that the formation conditions of were varied as follows:

Formation Condition 1: C/10 CC-CV to 4.25 V at 60° C.;
Formation Condition 2: C/10 CC-CV to 4.25 V at 45° C.;
Formation Condition 3: C/10 CC-CV to 4.25 V at 30° C.; and
Formation Condition 4: C/10 CC-CV to 4.25 V at 25° C.

Figure 8:
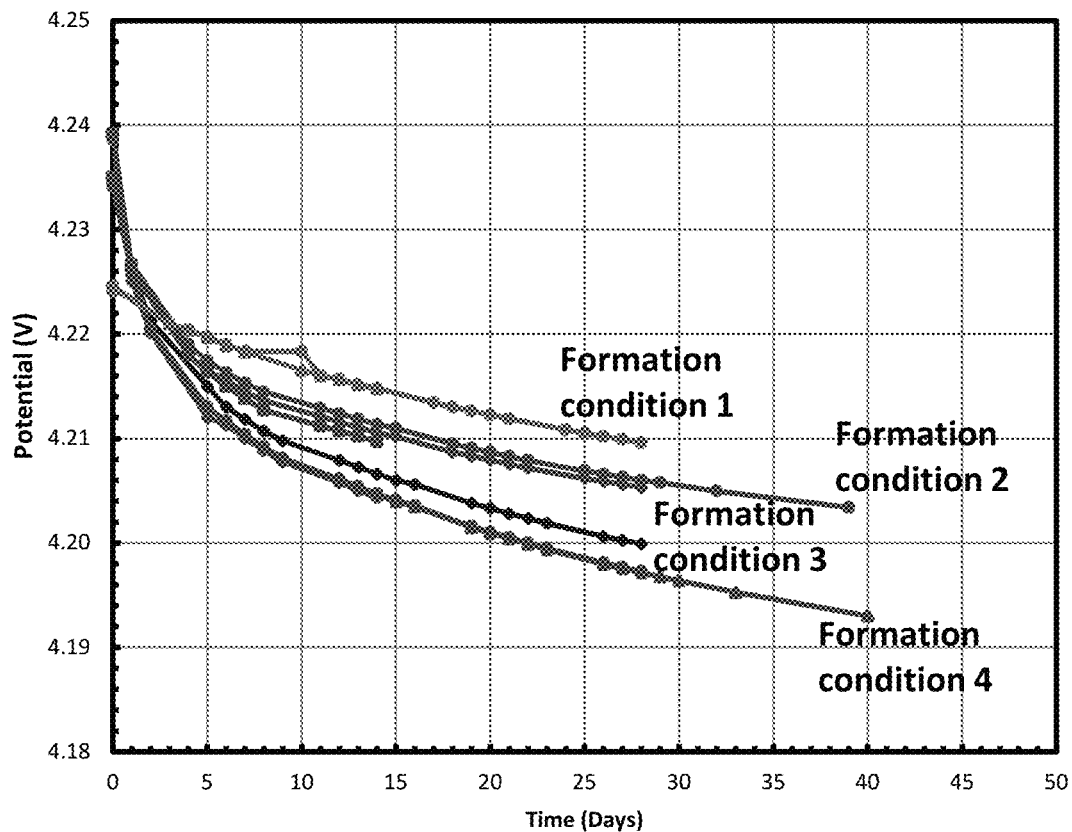
FIG. 8 shows curves for primary pouch cell open-circuit voltage (OCV) at different formation conditions.
Figure 9:
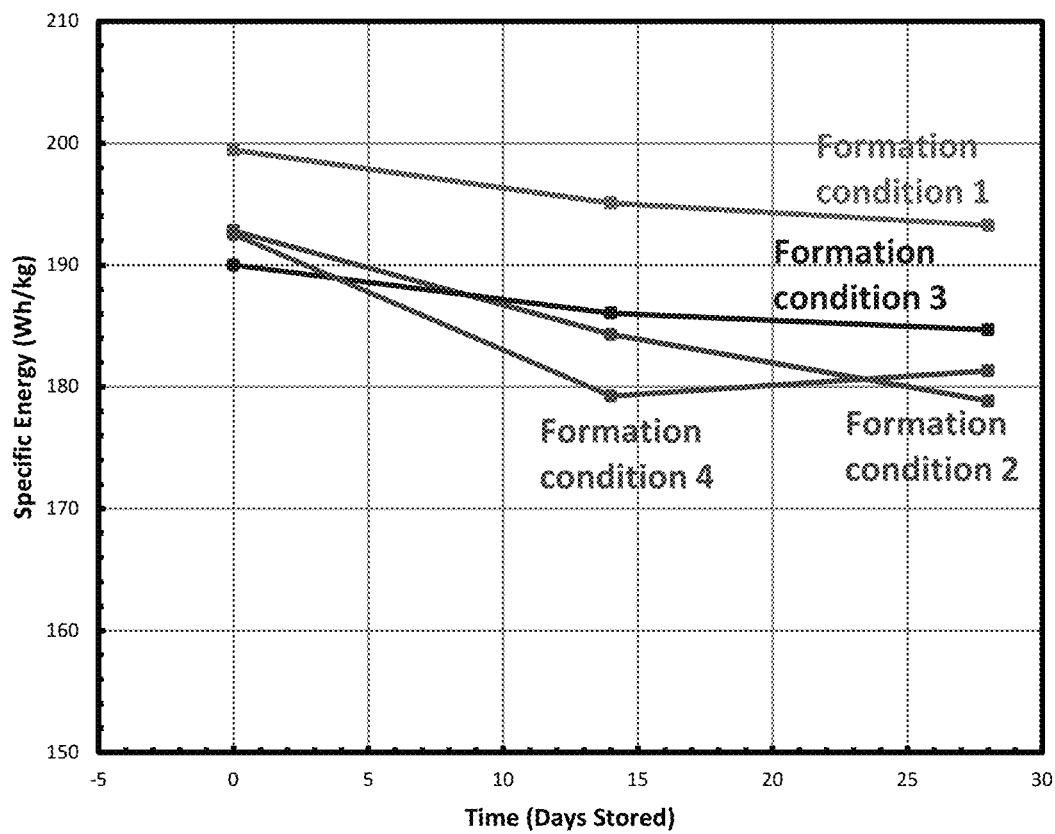
FIG. 9 shows curves for C-size primary pouch cell power discharge specific energy at different formation conditions.

After the initial charging was performed at the Formation Conditions, OCV and specific energy were measured for each of the pouch cells over a period of time at a storage temperature of 25° C. During the storage time period, a constant external pressure of 2 bar was applied to the pouch cells. The results of this experimentation are shown in FIGS. 8 and 9.

The results of the experimentation show that OCV was more stable for Formation Condition 1 due to the anode surface being covered with solid SEI film. Further, due to stable voltage and low impedance growth, the specific energy was most stable for Formation Condition 1 after a month of storage.

Example 5—OCV Transition Curves at Temperatures

Primary pouch cells were prepared in the same manner as Example 1. The formation condition was C/10 CC-CV charge to 4.25 V at 60° C.

Figure 10:
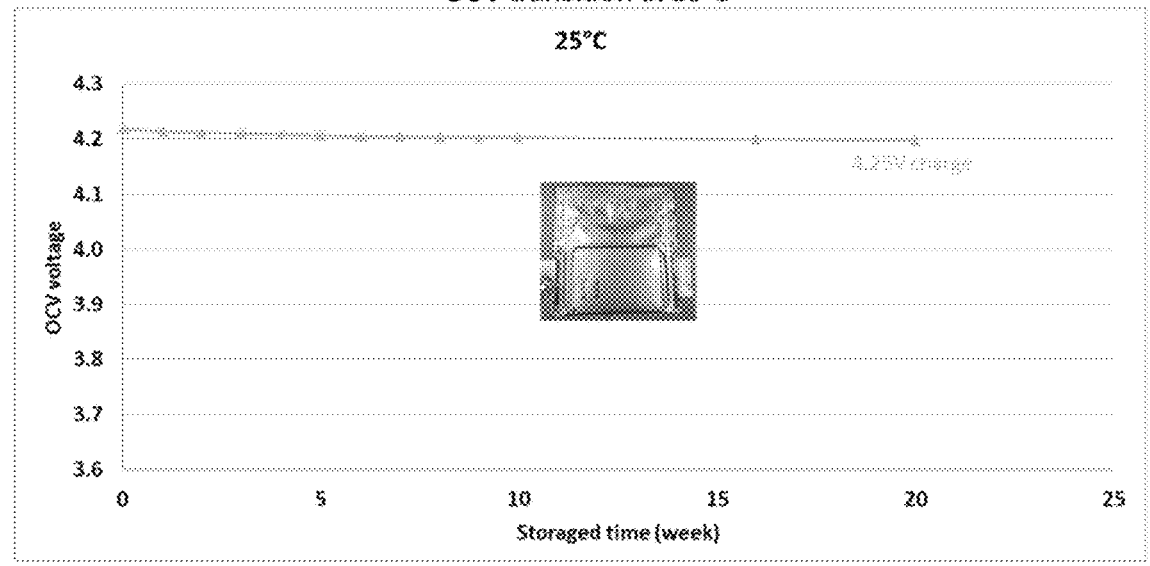
FIG. 10 shows an OCV transition curve for a pouch cell at 25° C.
Figure 11:
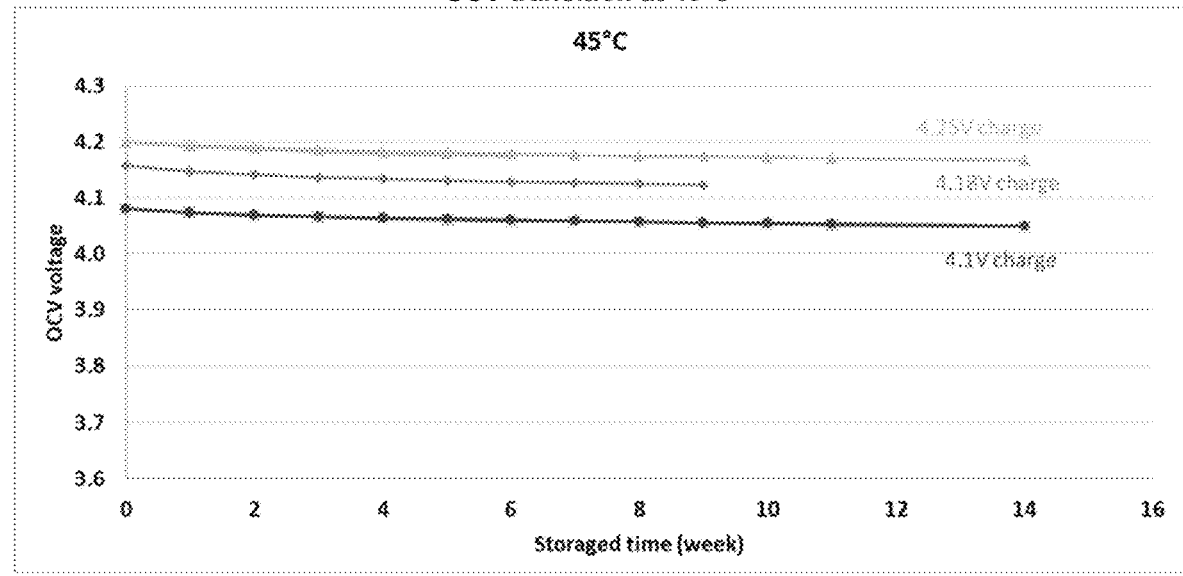
FIG. 11 shows an OCV transition curve for a pouch cell at 45° C.

After formation, OCV transition curves were obtained over a period of time for pouch cells stored for at 25° C. (see FIG. 10) and at 45° C. (see FIG. 11). During the storage time period, a constant external pressure of 2 bar was applied to the pouch cells.

The results of the experimentation show that, even over a long period of time and a wide range of storage temperature, the OCV was stable. This means that, after a long time of storage, the discharge power/energy of the pouch cell according to the present disclosure will be the same as (or substantially similar to) fresh cells.

Example 6—Discharge Curves at Currents

Primary pouch cells were prepared in the same manner as Example 1. The formation condition was C/10 CC-CV charge to 4.25 V at 60° C.

Figure 12:
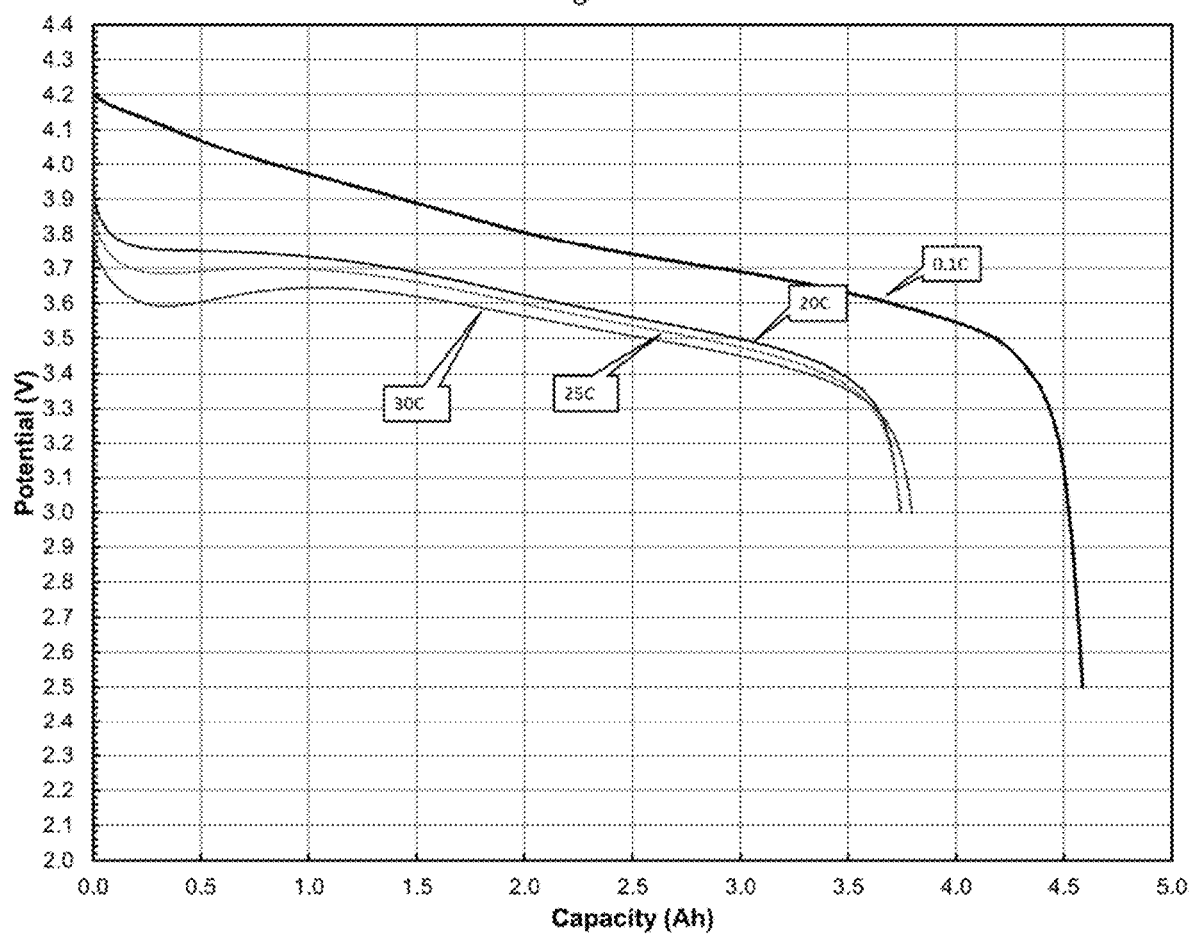
FIG. 12 shows a discharge curve for a pouch cell at various currents.

After formation, discharge curves were measured at various C rate at 25° C. During discharge, a constant external pressure of 2 bar was applied to the pouch cells. The results of this experimentation is shown in FIG. 12.

The pouch cells had a very high specific energy density of 225 Wh/Kg at 0.1 C. If a conventional Li ion cell (using graphite as an anode) was used, only a low rate up to 5C is possible. However, the primary pouch cell of the present disclosure is using deposited Li metal as an anode, and thus, the primary pouch cell is capable of a very high C rate discharge (up to 30 C) as well as a very high specific energy density.

The disclosure is susceptible to various modifications and alternative means, and specific examples thereof are herein described in detail. It should be understood, however, that the disclosure is not to be limited to the particular examples or methods disclosed, but to the contrary, the disclosure is to cover all modifications, equivalents, and alternatives falling within the spirit and scope of the claims. For example, while the pouch cells described in detail herein can beneficially be used a primary cells due, for example, to their low self-discharge rate, the cells could also be configured as high-voltage secondary (rechargeable) cells that can deliver many charge/discharge cycles.

The invention claimed is:

1. A pouch battery, comprising:
an electrode assembly; and
a multi-laminate case in which the electrode assembly is sealed and housed, wherein
the electrode assembly is formed by respectively overlaying a sheet cathode, a sheet separator, and a sheet anode to form a stacked structure, the stacked structure being optionally folded and/or wound upon itself,
the electrode assembly includes a cathode tab electrically connected to the sheet cathode, and an anode tab electrically connected to the sheet anode, the cathode tab and the anode tab extending from inside of the case to outside of the case,
the sheet cathode comprises a positive electrode active material disposed on a current collector,
the sheet anode consists essentially of a conductive metal other than lithium and a carbonaceous layer on a surface of the conductive metal, the carbonaceous layer having a thickness in the range from 4 to 10 μm,
the electrode assembly includes an electrolyte in contact with the sheet cathode and the sheet anode,
the multilaminate case comprising the following feature (a) or feature (b):
(a) the electrolyte has a solvent that is one or more selected from the group consisting of saturated cyclic carbonates, unsaturated cyclic carbonates, linear carbonates, alkyl esters, ethers, lactones, and mixtures thereof;
(b) the separator and the electrolyte are a single structure comprising a solid solvent-free electrolyte.

2. The pouch battery according to claim 1, further comprising means for applying external compression to surfaces of the case in a stacking direction of the stacked structure during operation of the pouch battery.

3. A battery module, comprising:
a housing including a first end plate and a second end plate; and
a plurality of pouch batteries according to claim 1, wherein
the plurality of pouch batteries are aligned in a stacking direction of the stacked structure of the electrode assembly, the pouch batteries disposed between the first end plate and the second end plate,
the battery module further comprises means for moving the first end plate relative to the second end plate to control an external compression force on the plurality of the pouch batteries during operation of the battery module,
the means for moving comprises one or more springs or a tensioning member, the one or more springs or the tensioning member being connected to the first and second end plates, the one or more springs or the tensioning member being configured to move one end plate towards the other during discharge of the battery module, and
the means for moving is configured to apply an external compression force to the plurality of the pouch batteries of from 0.5 Bar to 5 Bar during operation of the battery module.

4. The pouch battery according to claim 1, wherein the carbonaceous layer comprises a carbon allotrope or a derivative thereof.

5. The pouch battery according to claim 1, wherein the electrolyte comprises a lithium salt.

6. The pouch battery according to claim 1, wherein the conductive metal is selected from the group consisting of copper, nickel, and stainless steel.

7. The pouch battery according to claim 1, wherein the electrolyte comprises a lithium salt, and an additive for forming a solid-electrolyte interface (SEI), and
a content of the additive is 0.5 to 10% by weight when a total weight of the electrolyte is considered to be 100%.

8. The pouch battery according to claim 1, wherein the positive electrode active material is a compound according to one of the following formulas (A) to (E) or a blend thereof:

$$Li_{1+x}M1_aX_bPO_4 \quad \text{formula (A)};$$

$$Li_{1+x}Ni_aM2_dO_2 \quad \text{formula (B)};$$

$$LiMn_2O_4 \quad \text{formula (C)};$$

$$Li_{1+x}CoO_2 \quad \text{formula (D)};$$

$$LiVPO_4F \quad \text{formula (E)};$$

wherein, in formula (A), M1 is at least one selected from the group consisting of Fe, Mn and Co; X is at least one transition metal selected from the group consisting of Ni, V, Y, Mg, Ca, Ba, Al, Sc and Nd; $0 \leq x \leq 0.15$; $a>0$; $b \geq 0$; and $a+b=1$, wherein, in formula (B), M2 is at least one selected from the group consisting of Co, Al and Mn; X is at least one transition metal selected from the group consisting of Ni, V, Y, Mg, Ca, Ba, Al, Sc and Nd; $0 \leq x \leq 0.15$; $a>0$; $d>0$; and $a+d=1$, and wherein, in formula (D), $0 \leq x \leq 0.15$.

9. The battery module according to claim 3, wherein the battery module is configured such that a distance between the first end plate and the second end plate decreases during discharge.

10. The battery module according to claim 3, wherein the means for moving is configured to follow a contraction of the plurality of pouch batteries during discharge.

11. The battery module according to claim 3, wherein the means for moving is configured such that a distance between the first end plate and the second end plate decreases during discharge because of the external compression force.

12. A pouch battery, comprising:
an electrode assembly; and
a multi-laminate case in which the electrode assembly is sealed and housed, wherein
the electrode assembly is formed by respectively overlaying a sheet cathode, a sheet separator, and a sheet anode to form a stacked structure, the stacked structure being optionally folded and/or wound upon itself,
the electrode assembly includes a cathode tab electrically connected to the sheet cathode, and an anode tab electrically connected to the sheet anode, the cathode tab and the anode tab extending from inside of the case to outside of the case,
the sheet cathode comprises a positive electrode active material disposed on a current collector,
the sheet anode consists of a conductive metal other than lithium,
the electrode assembly includes an electrolyte in contact with the sheet cathode and the sheet anode,
the multilaminate case comprising the following feature (a) or feature (b):
  (a) the electrolyte has a solvent that is one or more selected from the group consisting of saturated cyclic carbonates, unsaturated cyclic carbonates, linear carbonates, alkyl esters, ethers, lactones, and mixtures thereof;
  b) the separator and the electrolyte are a single structure comprising a solid solvent-free electrolyte.

13. The pouch battery according to claim 12, wherein the positive electrode active material is a compound according to one of the following formulas (A) to (E) or a blend thereof:

$Li_{1+x}M1_aX_bPO_4$      formula (A);

$Li_{1+x}Ni_aM2_dO_2$      formula (B);

$LiMn_2O_4$      formula (C);

$Li_{1+x}CoO_2$      formula (D);

$LiVPO_4F$      formula (E);

wherein, in formula (A), M1 is at least one selected from the group consisting of Fe, Mn and Co; X is at least one transition metal selected from the group consisting of Ni, V, Y, Mg, Ca, Ba, Al, Sc and Nd; $0 \leq x \leq 0.15$; $a>0$; $b \geq 0$; and $a+b=1$, wherein, in formula (B), M2 is at least one selected from the group consisting of Co, Al and Mn; X is at least one transition metal selected from the group consisting of Ni, V, Y, Mg, Ca, Ba, Al, Sc and Nd; $0 \leq x \leq 0.15$; $a>0$; $d>0$; and $a+d=1$, and wherein, in formula (D), $0 \leq x \leq 0.15$.

14. A battery module, comprising:
a housing including a first end plate and a second end plate; and
a plurality of pouch batteries according to claim 12 aligned in a stacking direction of the stacked structure of the electrode assembly, the pouch batteries between disposed between the first end plate and the second end plate;
the battery module further comprises means for moving the first end plate relative to the second end plate to control an external compression force on the plurality of the pouch batteries during operation of the battery module,
the means for moving comprises one or more springs or a tensioning member, the one or more springs or the tensioning member being connected to the first and second end plates, the one or more springs or the tensioning member being configured to move one end plate towards the other during discharge of the battery module, and
the means for moving is configured to apply an external compression force to the plurality of the pouch batteries of from 0.5 Bar to 5 Bar during operation of the battery module.

* * * * *